Patented July 12, 1949

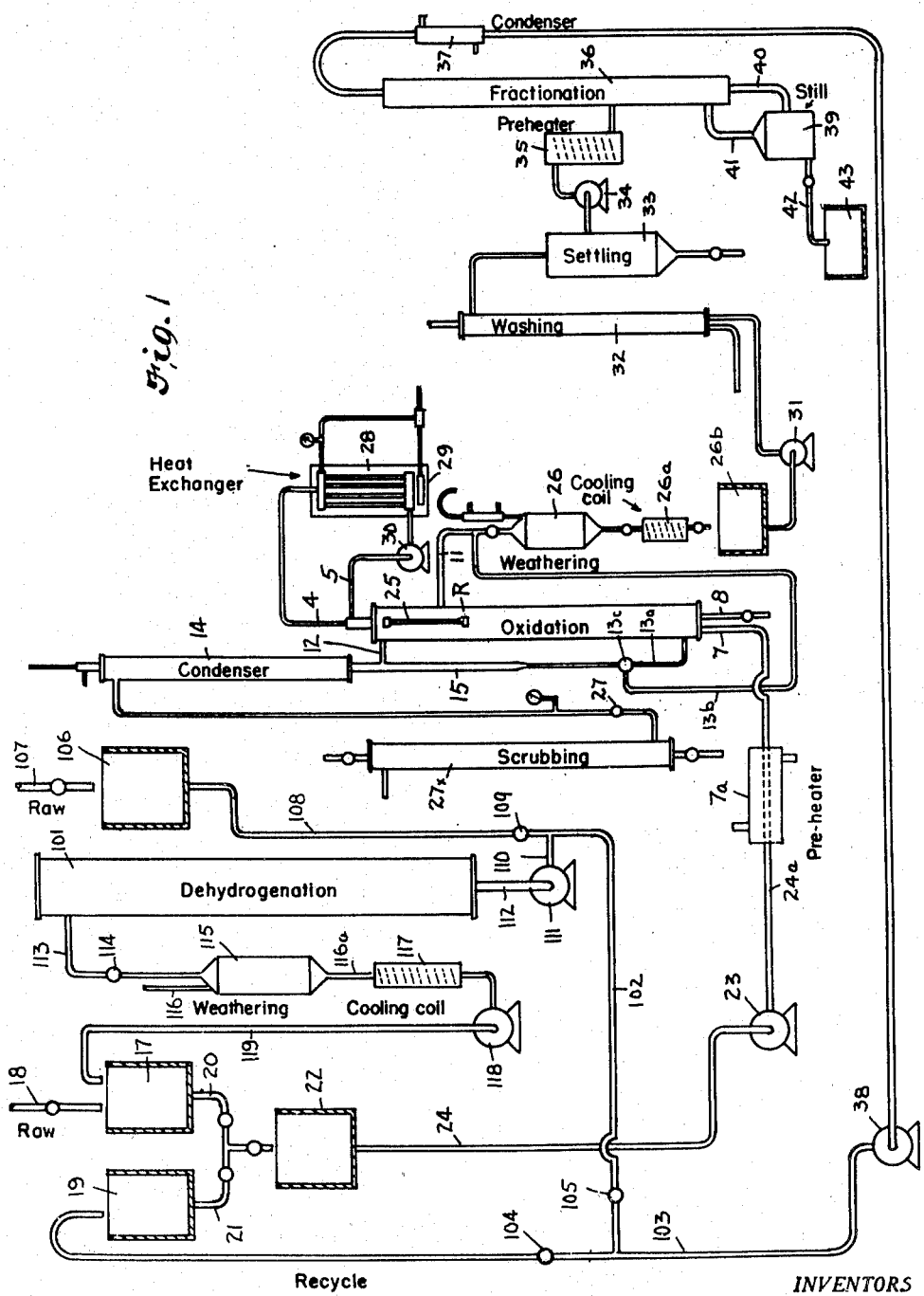

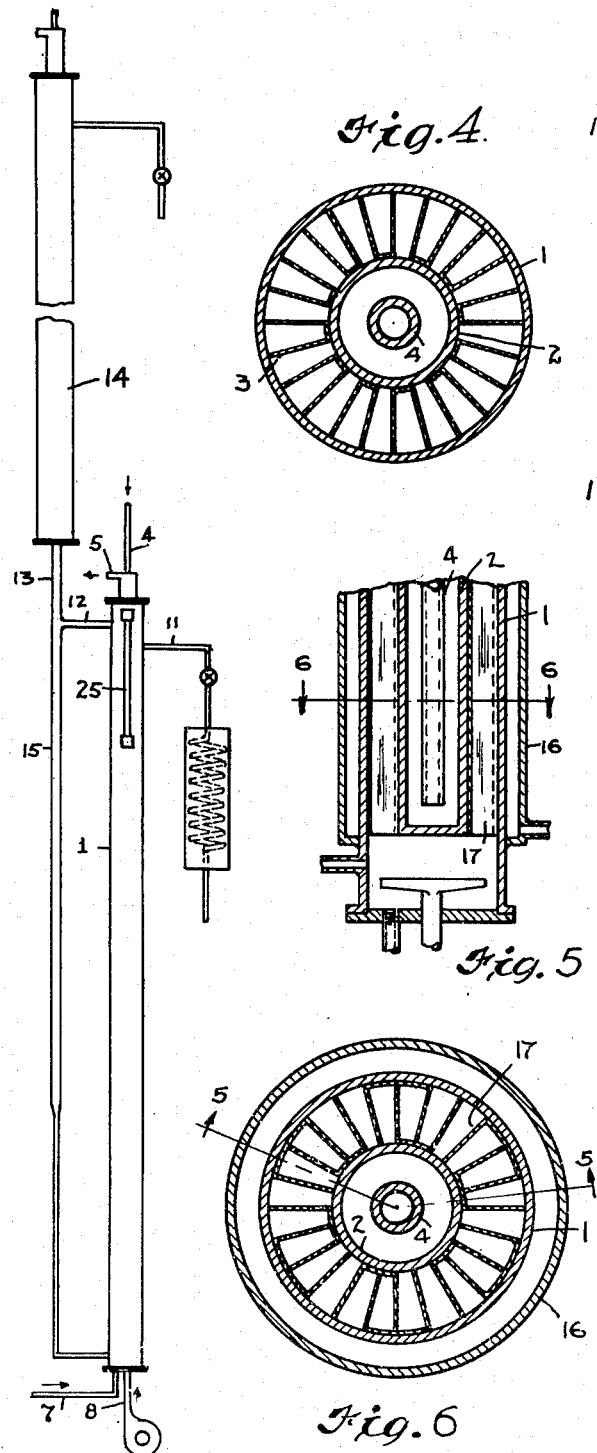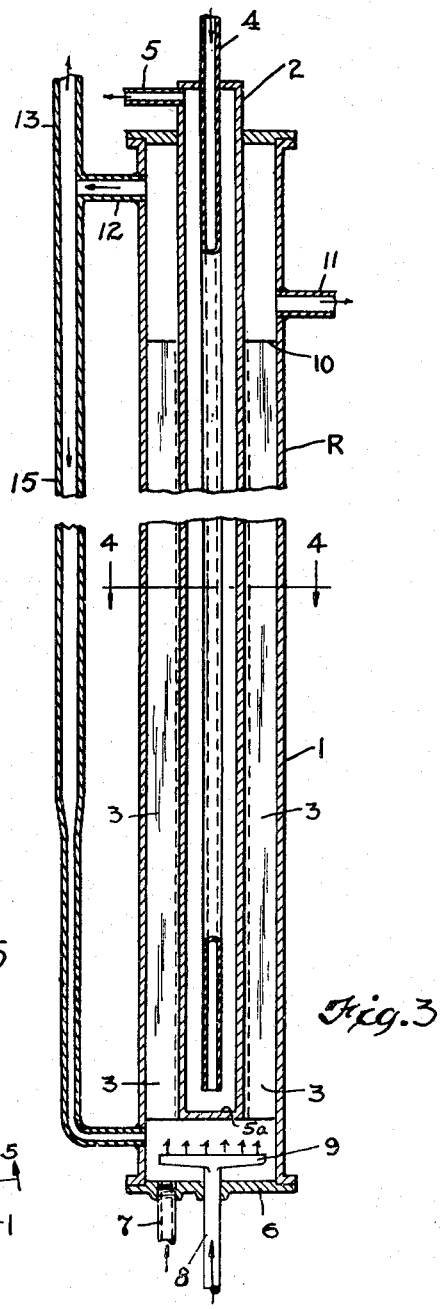

2,475,605

UNITED STATES PATENT OFFICE 2,475,605

PROCESS OF PRODUCING PREDOMINANTLY LOWER OXIDATION PRODUCTS FROM HYDROCARBONS

Carl F. Prutton, Cleveland Heights, Clark O. Miller, Cleveland, and Willis G. Craig, Cleveland Heights, Ohio, assignors to The Lubrizol Corporation, Wickliffe, Ohio, a corporation of Ohio Application March 25, 1944, Serial No. 528,070

2 Claims. (Cl. 260—451)

This invention relates as indicated to an oxidation process and an apparatus within which such process may be performed.

It has been known for some time that if hydrocarbons in the fluid state, i. e. liquid or gaseous, are subject to an oxygen containing gas such as air, the oxygen will combine with the hydrocarbon and produce products such as alcohols, ethers, ketones, and aldehydes, these being generally referred to as the lower oxidation products, and if the oxidation is permitted to continue, higher oxidation products such as acids are formed, and these will then react with any alcohols present in the consequent production of esters.

When it is desired to produce an oxidation product which is preponderantly of the lower oxidation materials, certain difficulties arise because of the necessity of preventing the formation of substantial amounts of the higher oxidation products such as the acids and the esters as above explained.

The prior art efforts along this line, in so far as they are pertinent to the present invention, may be sub-divided into three groups, each of which is represented by a number of patents. It is believed necessary only to refer to one prior art patent from each of such groups for a full understanding of the prior art over which the present invention is an improvement.

One class of prior art endeavor along this line is represented by the patent to Forrest et al. No. 1,916,923 which is concerned with a process characterized in that the hydrocarbons to be oxidized, such as toluene, are maintained in a liquid state in the lower part of a vessel, and through this bath is passed a stream of air, and the vapors arising from the bath, as a result of the reaction, are condensed in the upper portion of the vessel. In this patent there are outlined two alternative modes of procedure for effecting combination between the oxygen and the hydrocarbon. According to the first method, the hydrocarbon to be oxidized is first saturated with oxygen and then led into a reaction vessel where the temperature is raised to a point sufficient to permit the reaction to occur. In the second method outlined in that patent, the hydrocarbon to be oxidized is maintained in a liquid state in the lower portion of a reaction vessel and a stream of air bubbled therethrough with a condenser coil in the upper part of the vessel for the purpose of condensing such vapors as arise from the bath. In neither of these processes is there any provision for a control within accurate limits of the conditions under which the oxygen combines with the hydrocarbon. Unless there is some rather accurate control over such conditions, then the end product will contain relatively large proportions of the higher oxidation products. In this connection, it will be noted that in the Forrest specification, high concentrations of benzoic acid are indicated as having been found in the oxidation product.

A prior art patent which is representative of efforts to produce oxidation products which are predominantly of the lower oxidation range is Cockerville No. 2,250,468. This patent outlines a process in which the hydrocarbons are caused to trickle downwardly through a contact column with a counter-current flow of air or oxygen therethrough. The products discharged from the contact column are then fractionated, the oxidized products segregated, and the unoxidized component returned to the feed stream, so that the oxidation products are never permitted to recycle through the oxidation tower. Here again, however, there was no effort at any control over the temperature of the material at the moment of oxidation, and hence the oxidation products did contain substantial amounts of the higher oxidation materials.

Another class of prior art endeavor is represented by patents such as Loder No. 2,223,494 which discloses a process requiring the use of an oxidation catalyst. The present invention is concerned with a process which does not require the use of an oxidation catalyst.

It is a principal object of the present invention to provide a process of the character described and an apparatus for carrying out such process, characterized in that by careful control of various conditions under which the oxidation takes place, the character of the oxidation products can be carefully controlled.

Other objects of our invention will appear as the description proceeds.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Broadly stated, this invention is concerned with a process of producing oxidation products of hydrocarbons which comprises subjecting a hydrocarbon in the liquid state and preferably in the absence of a catalyst to the action of an oxygen containing gas, and simultaneously removing a substantial portion of the heat generated as the oxygen combines with such hydrocarbon.

More particularly this invention is concerned with a process which is capable of producing greater proportionate amounts of the lower oxidation products (alcohols, ketones and aldehydes) than prior art processes.

In the refinements of our process, and by which particularly desirable results may be achieved, especially with certain hydrocarbon starting materials, it is also contemplated that the hydrocarbon to be oxidized is diluted in a material which is preferably liquid and relatively non-oxidizable at the conditions under which the oxidation step is performed. In further refinements of our process, it is contemplated that there will be control within limits of the temperatures and pressures at which the oxidation step is performed.

In further refinements of our process, it is contemplated that the charging stock may be a substituted hydrocarbon, so that during or prior to the oxidation step, liberation of the substituent will leave an unsaturated material which will most readily combine with the oxygen.

In still further refinements of our process, it is contemplated that the charging stocks may include mixtures of saturated and unsaturated hydrocarbons such for example as the materials produced by partial dehydrogenation of saturated hydrocarbons.

Before proceeding with a more detailed description of our improved process, reference may be had to the accompanying drawings which show one embodiment of our new and improved apparatus which is believed patentable per se, and in which our process may be conveniently performed.

In said annexed drawings:

Fig. 1 is a flow diagram illustrating the various components of the complete process, with a diagrammatic representation of the apparatus used in each stage.

Fig. 2 is a side elevational view of the reactor, and its immediately associated apparatus which is employed for the purpose of combining the oxygen with the hydrocarbon.

Fig. 3 is a broken vertical section drawn to an enlarged scale of the reactor tube illustrated in Fig. 2.

Fig. 4 is a transverse sectional view of the reactor tube illustrated in Fig. 3 taken on a plane substantially indicated by the line 4—4.

Fig. 5 is a fragmentary sectional view showing a modified form of reactor tube similar to that illustrated in Fig. 3.

Fig. 6 is a transverse sectional view of the apparatus illustrated in Fig. 5, taken on a plane substantially indicated by the line 6—6.

Referring now more specifically to the drawings and more especially to Fig. 3, the reactor tube here illustrated, and within which the oxidation step is actually performed, comprises an elongated cylindrical member or tube 1, preferably formed of corrosion-resistant material. In a physical embodiment of this apparatus, the tube 1 was made of stainless steel, had an inside diameter of about two inches, and was about five feet long. Extending into one end of the tube 1 is a second tube 2 having a closed bottom, and also preferably formed of corrosion-resistant material such as stainless steel. In the previously referred to physical embodiment of the invention, the tube 2 had an outside diameter of one inch.

Secured, as by welding or the like, to the outer periphery of the inner tube 2 are a plurality of U-shaped fins 3 which extend into closely fitting engagement with the inner periphery of the outer tube 1 so as to define a plurality of laterally contiguous elongated passages extending axially through the reactor.

A third tube 4 extends into the inner tube 2 to a point near its lower closed end 5a, and such tube 4 is adapted to be connected to a suitable source of heat transfer fluid such as water. While water has been indicated as the suitable heat transfer fluid, other materials of a different heat capacity might be employed if desired. The end of the tube 2 where the tube 4 enters the same is sealed off and a discharge tube 5 is provided through which the heat transfer fluid is carried away.

At its lower end, the reactor is provided with a closure head 6 through which extends a conduit 7 for the supply of the hydrocarbon to be oxidized. A conduit 8 for the supply of an oxygen bearing gas, such as air, extends through the head 6, and on its inner end is provided with a diffuser plate 9. Since the spacer members 3 terminate at a substantial distance above the head 6, a charging and mixing zone is provided from which are supplied the more or less individual and distinct streams of hydrocarbon and gas which pass through the reactor between the spacers 3.

The spacer members or fins 3 extend to a line 10 which is near the end of the tube 1, remote from the charging end. At a slight distance above the ends of the spacers, the wall of the tube 1 is provided with an outlet spud 11, and at a point still closer to the remote end of the reaction tube there is provided a second outlet spud 12. The outlet spud 12 is connected to a tube 13 which leads to a condenser 14. In the form of construction illustrated in Figs. 2 and 3, the lower extension 15 of the tube 13 leads into the reactor R in the space between the head 6 and the lower ends of the fins 3. In a modified and preferred form of construction as illustrated in Fig. 1, the extension 15 is provided with branches 13a and 13b which respectively lead to the bottom of the reactor and the weathering tank 26 hereinafter more specifically described. A 3-way valve 13c controls this branched conduit.

The reactor which has just been described is characterized in that the temperature modifying fluid is introduced into the center of the reactor. It may be desirable to have a temperature modifying fluid not only in the center of the reactor, but also around the reaction tube in which case a structure like that illustrated in Figs. 5 and 6 may be employed. In Figs. 5 and 6, the center portion of the reactor is exactly like that illustrated in Figs. 3 and 4. In this modified construction, however, a third tube 16 surrounds the tube 1 for the circulation of a temperature modifying fluid in the space between the tubes 1 and 16. When this expedient is employed, the maximum heat exchange will be effected by using a slightly different form of U-shaped spacer member 17, and by having the spacer members alternately secured to the tube 1 and 16 with the legs of the spacer members arranged as illustrated in Fig. 6.

In Fig. 1 is illustrated diagrammatically the complete apparatus within which our process may be conveniently performed. In Fig. 1, there is provided a tank 17 for the storage of fresh hydrocarbon stock to be treated, and which will be supplied by a suitable valved inlet 18. A second storage tank 19 for recycle stock is also provided, and the two tanks are connected by appropriate valved conduits 20 and 21 through which properly proportioned amounts of fresh and recycle stock may be fed to the mixing tank 22 which feeds through conduit 24 to the injection pump 23 a stream of material which contains the correct proportionate amounts of raw and recycle stock.

When the raw material supply fed through the valved conduit 8 consists of or contains a substantial amount of unsaturates, then such stock admixed with recycle stock in the manner just described may be fed to the reactor by means of the injection pump 23. When, however, the charging stock consists substantially entirely of saturates, then it may be desirable to first at least partially dehydrogenate the raw stock or both the raw and recycle stock. Apparatus for the accomplishment of this dehydrogenation step would include a dehydrogenation unit 101 diagrammatically illustrated in Fig. 1. Since there are many forms of dehydrogenating apparatus available, it is believed unnecessary to illustrate the same in greater detail.

A valved conduit 102 is connected to the return line 103 for the recycle stock, the latter line also containing a valve 104 beyond the point where the conduit 102 is taken off. The valve 105 controls the flow through conduit 102. A second fresh stock tank 106 is supplied by means of a valved conduit 107. From the tank 106 a conduit 108 leads through a valve 109 into a common feed conduit 110 to which the recycle conduit 102 is also connected. The conduit 110 leads to a pump 111 which feeds the dehydrogenating apparatus through conduit 112.

The stock, after passing through the dehydrogenating apparatus 101, passes through a conduit 113, pressure reducing valve 114, and into a weathering tower 115 from which a vent stack 116 extends, through which the hydrogen and other gases liberated during the dehydrogenation process are vented. The stock then passes through conduit 116a through a cooling coil 117 to a pump 118 and conduit 119 to the storage tank 17.

When it is desired to at least partially dehydrogenate only the fresh stock, then valve 105 will be closed and valve 104 will remain open, and the valve in supply line 18 will be closed. When it is desired to dehydrogenate both the recycle stock and the fresh stock, then valve 104 will be closed, valves 105, 107, and 109 will be open, and the valve in conduit 21 will be closed.

The injection pump 23 is connected by means of a suitable conduit 24a to the conduit 7 which leads to the reactor R. In series in the conduit 24a is a preheater 7a of any conventional design which is used for the purpose of preheating the charging stock to substantially the temperature at which the oxidation process is carried on. If, as indicated at another place in this description the condensate from the condenser 14 is to be fed back to the feed end of the reactor, such condensate will usually be sufficiently highly heated so that it need not be preheated before introduction to the reactor. If desired, however, the conduit 13a may be joined to the conduit 24a ahead of the preheater 7 so that when a mixture of the charging stock from the pump 23 and the condensate from the condenser 14 is fed to the reactor, then such mixture will be preheated by the preheater 7a to the desired temperature.

The reactor generally indicated by R in Fig. 1 is provided with a sight glass 25, and in the preferred mode of operating our improved process, the rates of feed will be so regulated as to just maintain the liquid level in the reactor at the level of the discharge spud 11 from which the oxidized hydrocarbon mixture is led to a weathering tank 26, then through a cooling coil 26a.

The unreacted portion of the gas stream introduced to the conduit 8, after having the entrained hydrocarbons removed therefrom by the condenser 14, is discharged through a reducing valve 27 and then through a scrubbing tower such as 27x or vented either to the air or otherwise as desired. An analysis for oxygen content of the gas stream discharged through the reducing valve 27 is generally helpful in determining the best conditions of operation of the apparatus.

At this point, it should be mentioned that an accurate control of the temperature within the reactor is an essential and important feature of the present invention. It will be observed that the heat exchange medium circulated through the reactor is effective to abstract the heat from the spacers throughout the entire extent of the reaction tube so that the heat generated by the reaction within the liquid bath is immediately carried away. In this way, it is possible to prevent the occurrence of temperatures which are too high. This is important because it has been found that if the temperature is permitted to increase at the normal rate determined by the rate of oxygen combination, these higher temperatures will result in the production of the higher oxidation products which are undesirable.

This rather critical control over the temperature in the reactor may be accomplished as illustrated in Fig. 1 by connecting the pipes 4 and 5 to a water tube boiler 28 which is fired by some suitable means such as a hydrocarbon burner 29. A circulating pump 30 causes the circulation of the water in the closed system, and accordingly the temperature within the reactor may be accurately controlled by controlling the pressure within such closed system. This can be conveniently accomplished by any suitable means such as by the use of steam and cold water mixing valves. The precise method by which the temperature control is secured forms no part of the present invention. Various other expedients may be used for accurately controlling the temperature of the heat exchange medium.

The oxidized hydrocarbon mixture is preferably cooled as previously indicated in the water-jacketed cooling coil 26a to a temperature below the maximum temperature at which the oxidation products remain liquid at the pressure conditions in the system at this point.

After the material has been cooled it is run into a storage tank 26b from which it is circulated by means of a pump 31 through a counter-flow caustic washing tower 32 where the material is contacted with the caustic for the purpose of removing any traces of acids which might be converted to esters during subsequent distillation. The material discharged from the washing tower 32 passes to a settling tank 33, from which the material is decanted by means of a pump 34 which passes the same through a heating coil 35 and to a fractionating column 36.

The light ends of the mixture are passed through a condenser 37 and returned by means of a recycle pump 38 to the recycle storage tank 19. The heavier ends are discharged from the fractionating column 36 to a still or reboiler 39 through the conduit 40. The vapors from the still 39 are led by means of a conduit 41 into the fractionating column, where such vapors are split, the light fractions passing through the condenser 37 back to the recycle storage tank, and the heavier ends returned to the reboiler. The residue in the still or reboiler 39 may be periodically or continuously withdrawn through the valved conduit 42 to the crude product storage tank 43.

It will be observed that the recycle stock and the fresh storage stock are led through valve conduits 20 and 21 to the mixing tank 22, this making possible an accurate proportioning of the amount of the two stocks ultimately fed to the reactor by the injection pump.

The reason for accurately proportioning the amount of fresh stock and recycle stock which is fed to the injection pump, and accordingly to the feed end of the reactor, is that the recycle stock preferably contains some minor amounts of oxidized hydrocarbon material, and such material has been found to have an initiating effect on the oxidation process and to reduce the induction period.

From the foregoing description, it will be observed that the process and apparatus of our invention are capable of use in the oxidation of any hydrocarbon material which under the temperature and pressure conditions maintained in the reactor will be in the liquid state. Accordingly, either saturated or unsaturated hydrocarbons may be oxidized. Generally best results will be secured, however, if the charging material for the process is an unsaturate or contains unsaturates. The broad class of unsaturates which are preferred as charging stock are either the cyclic, straight chain, or branched chain unsaturated hydrocarbons which contain at least one unsaturated bond.

The unsaturated or olefinic grouping will preferably occur in the main body of the molecule, i. e. in the longest chain of branched chain structures and in the ring of cyclic structures.

In the following table will be found listed a number of hydrocarbon materials which may be oxidized in accordance with the process and by the apparatus of our invention:

(1) Paraffins of two or more carbon atoms
   (a) Straight chain
      Propane
      Butane
      Pentane
      Hexane
      Heptane
      Octane
      Nonane
      Decane
      Commercial materials comprising mixtures of straight chain hydrocarbons, e. g. paraffin wax
   (b) Branched chain
      Iso butane
      Iso pentanes
      Commercial hexanes
      Commercial heptanes
      Commercial octanes
      Commercial nonanes
      Commercial decanes (2) Olefins of two or more carbon atoms
   (a) Straight chain
      Ethylene
      Propylene
      Butylenes
      Pentenes
      Hexenes, e. g. Hexene 2
      Heptenes
      Octenes
      Nonenes
      Decenes
      Commercial mixtures comprising mixtures of straight chain olefins, e. g. partially dehydrogenated paraffin wax
   (b) Branched chain
      Iso butylene
      Di-isobutylenes, e. g.
         (a) 2,4,4, Trimethyl pentene-1
         (b) 2,4,4, Trimethyl pentene-2
      Tri-isobutylenes
      Tetraisobutylenes
      Commercial mixtures comprising mixtures of branched chain olefins, e. g. butylene and iso-butylene polymers, "cold acid" polymers (3) Cycloparaffins
   Cyclopropane
   Cyclobutane
   Cyclopentane
   Cyclohexane
   Commercial mixtures of cycloparaffins, e. g. petroleum cycloparaffins (4) Cyclo-olefins
   Methyl cyclopropanes
   Methyl cyclobutenes
   Methyl cyclopentenes
   Methyl cyclohexenes
   Cyclo-propene
   Cyclo-butene
   Cyclo-pentene
   Cyclo-hexene
   Commercial mixtures comprising mixtures of cyclo-olefins, e. g. dehydrogenated petroleum cycloparaffins (5) Alkyl naphthenes
   Methyl cyclopropane
   Methyl cyclobutane
   Methyl cyclopentane
   Methyl cyclohexane
   Propyl cyclopropanes
   Propyl cyclobutanes
   Propyl cyclopentanes
   Propyl cyclohexanes
   Commercial mixtures comprising mixtures of alkyl naphthenes, e. g. petroleum naphthenes (6) Alkyl aromatics
   Ethyl benzenes
   Styrene
   Propyl benzenes
   Butyl benzenes
   Pentyl benzenes
   Hexyl benzenes
   Heptyl benzenes
   Octyl benzenes
   Ethyl toluenes
   Propyl toluenes
   Butyl toluenes
   Pentyl toluenes
   Hexyl toluenes
   Heptyl toluenes
   Octyl toluenes
   Propenyl benzenes (6) Alkyl aromatics—Continued
   Butenyl benzenes
   Pentenyl benzenes
   Hexenyl benzenes
   Commercial mixtures comprising mixtures of alkyl aromatics
(7) Halogen or negatively substituted naphthenes
   Methyl cyclohexyl chloride
   Methyl cyclopentyl chloride
   Methyl cyclobutyl chloride
   Methyl cyclopropyl chloride
   Cyclohexyl chloride
   Cyclopentyl chloride
   Cyclobutyl chloride
   Cyclopropyl chloride
   Commercial mixtures comprising mixtures of halogenated or otherwise negatively substituted naphthenes, e. g. chlorinated petroleum naphthenes
(8) Halogen or negatively substituted paraffins
   Ethyl chloride
   Propyl chloride
   Butyl chloride
   Pentyl chloride
   Hexyl chloride
   Heptyl chloride
   Octyl chloride
   Nonyl chloride
   Decyl chloride
   Lauryl chloride
   Commercial mixtures comprsing mixtures of halogenated or otherwise negatively substituted paraffins e. g. chlorinated paraffin wax Throughout the foregoing lists a number of specific materials have been mentioned. It should be noted that commercially available forms of these materials, which usually comprise mixtures of the named material with other substances, are suitable for use.

In carrying out our process, it is desirable in certain cases to use a saturated starting material such as cyclohexane. This material is first halogenated by the conventional and well-known process of bubbling a halogen such as chloride therethrough until it contains an amount of halogen equal to the equivalent of at least one atom of halogen per molecule. This halogenated material is then fed to the reactor, and the temperature and pressure conditions within the reactor are such as to first dehydrohalogenate the material, leaving an unsaturate which then readily combines with oxygen of the gas stream in the production of the oxidized hydrocarbon.

Another type of material which will be found satisfactory for use as charging stock includes the chlorinated paraffin waxes and it will generally be preferable to use a pure monochlor wax which may be prepared by chlorinating paraffin wax until it contains a total weight of combined chlorine equivalent to one atom of chlorine per molecule. This chlorinated mixture will consist of some unchlorinated wax, some monochlor wax, and some polychlor materials. The monochlor wax may be separated from the mixture by crystallization under carefully controlled temperatures from a solution of the chlorinated mass in acetone.

It is also within the contemplation of our invention to dilute the charging stock with some material which will not oxidize in passing through the reactor, and which has a boiling point different from the boiling point range of the oxidized material so that it may be fractionated from the desired end product. If the boiling point of the diluent material is substantially lower than the boiling point range of the oxidized end products, then the diluent material will pass through the fractionating column 35 and then be recycled and thus stay in the system. One such diluent material which has been found useful is benzene, since under the conditions of operation of our improved process and apparatus, when oxidizing certain types of hydrocarbons, benzene is not oxidized at least to any substantial degree.

A diluent material is thus used for several reasons. In the first place, it attenuates i. e. decreases the concentration of the oxidizable material in the zone where oxidation occurs. This is desirable when it is necessary to avoid too rapid oxidation, in order that the oxidation may proceed at a controlled rate such that a minimum of acids are formed. Further, by diluting the oxidized materials, there is less opportunity for reaction between the oxidized materials, than when no diluent is used.

The use of a diluent in attenuating the oxidizable material in the oxidation zone also makes possible a more accurate temperature control in that zone, and furthermore, the diluent material may itself serve as a temperature-carrying medium in keeping down excessive temperatures in the oxidation zone.

Another and important function of a diluent material such as benzene is that it serves a convenient means for holding in solution, i. e. in the liquid state, low boiling hydrocarbons which may be either the sole hydrocarbon to be oxidized, or a portion of the mass to be oxidized.

In addition to benzene, other diluent materials which may be employed are:
Cycloparaffins
Paraffins
Methyl substituted aromatics
Tert-butyl substituted aromatics
Esters
Ketones
Ethers
Halogenated hydrocarbons The cycloparaffins and paraffins are generally preferred as the diluent materials when oxidizing an olefin.

In order to introduce a diluent material, use may be made of commercial materials comprising mixtures of unsaturated hydrocarbons with other hydrocarbons relatively less easily oxidized. Examples of such mixtures are certain petroleum fractions which contain substantial amounts of unsaturated hydrocarbons together with saturated hydrocarbons which may, for example, be paraffinic, cycloparaffinic, or aromatic, or mixtures of such saturated hydrocarbons. Other examples of such mixtures may be obtained by dehydrogenation processes applied to materials which consist originally substantially entirely of saturated hydrocarbons. When mixtures of this kind are used, the unsaturated hydrocarbons present are very much more readily oxidized than the remaining hydrocarbons so that the latter will act as the relatively non-oxidizable diluent.

The process may be carried on at any desirable pressure depending upon the particular material to be oxidized. Generally best results from an operational and economy standpoint will be secured if the pressure within the reactor is just high enough to maintain the material to be oxidized in the liquid phase in the oxidation zone.

For certain desirable results, the pressure may be increased, however, very substantially above that required to maintain the hydrocarbon in the liquid phase, and it is within the contemplation of our invention to utilize pressures up to two thousand pounds per square inch. An increase in the pressure above atmospheric not only insures maintaining the hydrocarbon in the liquid state, but also by compressing the volume of the gas stream increases the oxygen concentration, and thus increases the rate of oxidation when this is desired.

The use of high pressures permits a greater rate of "through-put" due to a smaller volume of gas. This also increases the rate of heat transfer in the reactor and make possible better temperature control.

The temperature at which the process may best be performed will vary with the particular hydrocarbons being oxidized. Generally, the temperature of the liquid hydrocarbon should be maintained between 100° C. and 180° C. When the charging is substantially all saturated hydrocarbons higher temperatures may be required, for example from 140° to 170° C.

In order to increase the relative proportion of primary oxidation products it is advantageous to limit the actual time of contact between the hydrocarbon and the oxygen to a minimum necessary for economical operation of the oxidation process.

For unsaturated hydrocarbons, we have found an optimum "apparent" time of contact to be about ten minutes, and in general, the "apparent" time of contact for such hydrocarbons should be within the range of from about 5 to 25 minutes. The "apparent" time of contact is determined from the hydrocarbon rate of flow and the hydrocarbon volume contents of the reaction zone at a given air rate and pressure.

Numerous attempts have been made in the past to produce primary oxidation products, i. e. alcohols and ketones, by the direct oxidation of hydrocarbons. These attempts have generally given low yields and failed to result in commercially feasible processes due to the inability to control the course of the reaction. The reaction is really a partial combustion liberating large quantities of heat when an appreciable (commercial) oxidation rate is used. Unless this heat is removed, the reaction temperature rises to "burning" temperature and the system forms quantities of secondary oxidation products.

Very slow oxidation at low temperature (Loder 2,223,493) is also not practicable for the production of primary oxidation products since this requires a long time of contact, and primary oxidation products are then further oxidized to acids and carbon dioxide.

Desirable primary products (alcohols, ketones, etc.) have been produced (Forrest et al. 1,916,923) but in order to prevent the formation of higher oxidation products, conversions have necessarily been so small as to block commercial application.

Our contribution to the art has been to provide for the first time the correct control of all of the several variables, thereby obtaining yields of primary oxidation products which are of commercial practicability. We have also been first to apply air oxidation of olefins in the liquid state (phase). This is our preferred material.

The principal variables influencing the direct air oxidation of hydrocarbons are temperature and contact time. These two variables are closely interrelated, and when either or both are excessive, undesirable products are produced.

1. High temperature causes over-oxidation due to combustion.
2. Long contact time permits the interaction of primary oxidation products (condensation and polymerization) as well as further oxidation of the products by additional oxygen.

Broadly speaking, hydrocarbons may be placed into two categories:

1. Those having a pronounced oxidation resistance (induction period) as the paraffins, cycloparaffins, and aromatics.
2. Those in which the induction period is not pronounced as the olefins.

In the case of the paraffins, controlled oxidation to primary oxidation products is more difficult since the temperature necessary to shorten the induction period, and thereby the contact time, may be high enough to cause some overoxidation of the product.

With olefins, on the other hand, the induction period is very short at temperatures above 100° C. Adequate oxygen absorption can be more readily maintained at low temperatures and short contact time giving good conversions to primary oxidation products, provided the heat of reaction is maintained at a low value by efficient cooling.

For commercial application, it is necessary that a large amount of oxygen be absorbed by the hydrocarbon in order to secure adequate yields per pass and avoid distilling and recycling large volumes of unconverted hydrocarbon. This means that the temperature and contact time of the reaction must be adjusted to give the optimum combination of high conversion and desired quality of product. Approximate optimum conditions for good yields are set forth in the specific examples attached.

While we have discovered that paraffins and cycloparaffins may be oxidized in good yields to a complex mixture of oxidation products suitable for solvents, etc., the preferred materials are the olefins and cyclo-olefins or unsaturated hydrocarbons.

Cobalt, nickel, lead, and manganese naphthenates (to make the metal oil-soluble) have been used and found to be effective. However, they are quickly precipitated by the oxygen as insoluble oxides which deposit in our continuous apparatus, hence are undesirable.

We have found that partially oxidized hydrocarbons and particularly partially oxidized olefins are good oxidation initiators; that is, they tend to reduce the induction period. By using these materials, no deposits are left in the reactor.

By the use of rigorous temperature control, we have discovered that we can selectively oxidize certain hydrocarbons in the presence of other materials. In other words, we can select:

1. Olefins from naphthenes,
2. Olefins from paraffins,
3. Olefins from aromatics,
4. Naphthenes and paraffins from aromatics, and oxidise these selected hydrocarbons without appreciably effecting the other constituent of the mixture. This allows us to utilize, in the case of olefins, cheap raw materials in the form of fractions of cracked distillates.

We wish to emphasize the fact that by providing a process in which, for the first time, there can be an efficient temperature control, we are able, for the first time, to react a large amount of oxygen with a relatively small amount of hydrocarbon in a relatively short time without causing excessive temperatures which would result in the formation of undesirably large percentages of the higher oxidation products. This factor is largely responsible for the truly commercial conversions we have been able to obtain. It also has the added advantage that because of the very efficient cooling we are able to obtain good conversions at relatively short contact time between the oxygen and hydrocarbon.

As shown in the table of specific examples which follows we have shown satisfactory yields when the contact time has been not in excess of one hour and preferably not in excess of thirty (30) minutes and still more desirably not in excess of fifteen (15) minutes. It may be noted that when the material being oxidized is predominantly unsaturates the contact time will preferably be in the lower portion of the foregoing range, i. e. not over 30 and preferably not over 15 minutes. When the material being oxidized consists largely of saturates the contact time will be in the upper portion of the previously given range, i. e. from about 30 to 60 minutes.

Another important feature of our invention is the relatively high oxygen-hydrocarbon ratio we have been able to achieve in the relatively short periods of contact time given above. From the table of examples it will be noted that the pounds oxygen per pounds hydrocarbon per minute of contact time of those examples which showed best results lay within the range of from .02 to .05 with a number of the examples in the narrow range from .025 to .035.

The oxidation of normally gaseous hydrocarbons can be accomplished by dissolving the gaseous hydrocarbons in a liquid under pressure, or by using sufficiently high pressures to maintain them in the liquid state, and oxidizing in a similar manner (thereby assuring good contact and excellent heat control due to the high specific heat of the liquid as compared to the gas). Olefin gases are preferred to paraffin.

The following table gives pertinent data with respect to a number of different examples of operation of our improved process.

| Example No. | 1 | 2 | 3 | 4 | 5 | 6 | 7 | 8 | 9 |
|---|---|---|---|---|---|---|---|---|---|
| Material | [1] DIB | DIB | 50% DIB [2] 50% MCH | 50% DIB 50% C$_6$H$_6$ | n-Octane | Diamylene | Isoheptene | Tri-iso-butylene | Methyl Cyclohexane |
| Pressure in lbs. sq./inch | 200 | 200 | 200 | 200 | 200 | 150 | 150 | 200 | 200 |
| Temperature, °C | 130-135 | 144-150 | 140-145 | 153-517 | 115-130 | 120 | 135-145 | 134-147 | 140-150 |
| Contact time in minutes | 35 | 10 | 10 | 20 | 30 | 55 | 15 | 10 | 60 |
| C$_2$ absorption in moles/mole H:C | 0.92 | .735 | 0.825 | 0.765 | 0.925 | 0.210 | 0.635 | 0.790 | 0.625 |
| Pounds of air per lb. hydrocarbon | 4.3 | 1.28 | 1.83 | 4.0 | 1.88 | 0.35 | 1.84 | 1.14 | 4.02 |
| Total percent oxidized | 57.4 | 44.24 | 43.0 | 33.0 (est.) | 64.0 | 21.4 | 45.5 | 41.0 | 34.0 |
| Percent heavy [3] product | 42.8 | 31.85 | 32.6 | 29.4 | 35.7 | 21.4 | 26.0 | 21.1 | 9.1 |
| Percent light [4] product | 8.25 | 9.9 | 8.0 | 3.0 (est.) | 16.4 | 0.0 | 18.0 | 9.8 | 20.0 |
| Percent recycle | 42.6 | 55.76 | 57.0 | 67.0 (est.) | 36.0 | 78.2 | 54.5 | 59.0 | 66.0 |
| Analysis of Heavy Product: | | | | | | | | | |
| Acid No | 24.1 | 5.1 | 2.7 | 33.2 | 19.5 | 0.84 | 4.1 | 1.1 | 26.9 |
| Saponification No | 78.0 | 55.5 | 36.8 | 70.3 | 90.3 | 3.2 | 48.1 | 22.8 | 58.7 |
| Percent Alcoholic OH | 3.30 | 3.22 | 4.0 | 4.61 | 5.11 | 3.2 | 3.11 | 1.73 | 3.10 |
| Percent Carbonyl (ketone aldehyde) | 1.83 | 3.79 | 2.46 | 3.09 | 0.0 | 2.42 | 2.51 | 0.45 | 3.64 |
| Percent heavy product as alcohol, ketone and aldehyde | 39.7 | 55.3 | 50.4 | 60.2 | 38.4 | 63.4 | 38.5 | 16.5 | 53.1 |
| Analysis of Light Product: | | | | | | | | | |
| Acid No | 7.8 | 2.82 | (5) | (5) | 39.6 | (5) | 1.8 | 8.6 | (5) |
| Saponification | 25.2 | 14.10 | (5) | (5) | 54.9 | (5) | 12.3 | 31.4 | (5) |
| Percent Alcoholic OH | 3.5 | 5.02 | (5) | (5) | 1.46 | (5) | 0.79 | 3.03 | (5) |
| Percent Carbonyl | 2.6 | 4.79 | (5) | (5) | 1.07 | (5) | 1.41 | 5.78 | (5) |

[1] DIB = di-isobutylene.
[2] MCH = methyl Cyclohexene.
[3] Heavier than charging stock.
[4] Lighter than charging stock.
[5] Not analyzed.

For a full understanding of the values which appear opposite the several headings, and for a full understanding of the manner in which these determinations were made, reference may be had to the following calculation for Example No. I.

*Calculation of Example No. I*

9.56 lbs. of di-isobutylene (M. W.=112) were fed to the reactor under conditions of 200 lbs./sq. inch, and at a temperature range of 130–133° C. The rate of feeding was 28.0 cc. per minute, which in relation to the hydrocarbon volume of the reactor when air is being passed therethrough at a definite rate, results in an "apparent" contact time of 35 minutes.

Air was passed through the reactor at a rate of 2.0 cu. feet/minute, measured on the exit side of the reactor. The total volume of air passed through was 560 cu. feet. Correcting to standard conditions, and calculating the weight of air passed through per pound of hydrocarbon charged:

$$560 \frac{(0.818)(492)(28.8)}{(0.79)(535)(359)(9.56)} = 4.3 \text{ lbs. air per lb. hydrocarbon.}$$

The amount of oxygen absorbed was calculated from analysis of the exit gases made during the run. The average per cent O$_2$ in the exit gas was 16.8% by volume, and the average per cent CO$_2$ in the exit gas was 1.4% by volume. The calculation for oxygen absorption in moles of oxygen per mole of hydrocarbon charged was:

$$560 \frac{\frac{(100-16.8-1.4) \times 0.21}{79} - 0.168}{359 \times \frac{9.56}{112}} = 0.92 \text{ mol O}_2/\text{mol}$$

9.92 pounds of crude oxidized hydrocarbon were recovered from the reactor, of which 0.10 pound was water and oil insolubles. Thus the net oxidized hydrocarbon recovered was 9.82 pounds, and the overall yield of oxidation mixture was 9.82/9.56, or 102.5%.

This material was then washed to remove acids, which may later be recovered. The washing loss, figured by weight differences before and after washing, was found to be 0.38 pound. Therefore, the washing loss was 0.38/9.82, or 3.9%. To base the washing loss on the original hydrocarbon charged, the gain in weight through oxidation was absorbed, i. e., 9.82—0.38=9.44 pounds, or the net loss by washing was 9.56—9.44=0.12 pound. The washing loss per cent was then 0.12/9.56, or 1.25%.

9.44 pounds of washed crude was charged to the still, and on distillation, the following weights and percentages were obtained:

|  | Pounds | Per cent |
|---|---|---|
| Hydrocarbon Charged | 9.44 | |
| Light Product | 0.79 | 8.25 |
| Recycle | 4.07 | 42.6 |
| Heavy Product | 4.09 | 42.8 |
| Residue | 0.22 | 2.3 |
| Distillation Loss | 0.23 | 2.4 |
| Water | 0.07 | 0.73 |
| Washing Loss | 0.12 | 1.25 |
| Totals | 9.59 | 100.33 |

In calculating conversions and yields, the conversion to oxidized products, including losses as water, $CO_2$, etc. was the difference between 9.56 pounds charged and 4.07 pounds recycle which can be reprocessed, or 5.49 pounds. Expressed in per cent, the conversion was 5.49/9.56, or 57.4%. Since the recycle can be reoxidized to give approximately the same products as in the first place, it was, therefore, proper to correct the yields to be based upon the amount of hydrocarbon converted, i. e., the conversion. Therefore, the yields of heavy and light products were:

Heavy Product=42.8/57.4=74.5%
Light Product=8.25/57.4=14.4% and the total yield of usable oxidized products (excluding water, distillation losses, and acids removed by washing) was the sum of the above figures, or 88.9%. Losses were combined and similarly corrected giving as totaled losses 6.68%/57.4%, or 11.8%. This accounts for the total material charged, or 100.7%.

Analytical values for acid number, saponification number, per cent alcoholic OH, and per cent carbonyl were determined by ordinary analytical methods. However, in converting to per cent alcohol and per cent ketone and aldehyde, assumptions were made with regard to the molecular weights involved. These were arrived at by boiling range data.

Throughout the foregoing description and in the appended claims, reference has been made to "partially dehydrogenated hydrocarbons." By such term, we intend to mean a hydrocarbon mass which contains a substantial percentage of molecules each having at least one unsaturated bond resulting from the successful dehydrogenation of those molecules. Such mass will usually also contain a percentage of saturated molecules which have not been dehydrogenated, as well as a certain percentage which have been dehydrogenated to the extent that they contain more than one unsaturated bond per molecule.

It will be observed that it is a feature of the method and apparatus of our invention that the material undergoing oxidation is at all times in close proximity to a heat abstracting surface. This is an important factor in insuring that a preponderance of the lower oxidation products will be formed. It will generally be found that best results will be secured if the apparatus used for the purpose of carrying out our process is constructed so that the liquid hydrocarbon mass undergoing oxidation has at least the major portion within a distance not substantially in excess of 2 inches and preferably within 1 inch, and still more desirably within ½ inch from a heat abstracting surface so that the temperature throughout the entire reaction mass is at all times maintained within the limits specified.

In the foregoing description of our invention we have referred to the use of halogen substituted hydrocarbons as charging stock for the purpose of providing a material which is somewhat more readily oxidized than a saturated hydrocarbon. It is within the contemplation of our invention to further increase the oxidation rate of such materials by simultaneous dehydrohalogenation of such halogen substituted hydrocarbon charging stock. This can be accomplished conveniently by passing an alkali solution through the reactor, preferably counter-currently to the flow of hydrocarbon therethrough. It should be noted of course that even without the use of such caustic the oxygen in the air passing through the hydrocarbon in the reactor R will cause a dehydrohalogenation of the halogen substituted hydrocarbon feed stock thus providing in situ an unsaturated material whose oxidation rate is sufficiently high for good results.

Other modes of applying the principle of the invention may be employed, change being made as regards the details described provided the features stated in any of the following claims or the equivalent of such be employed.

We therefore particularly point out and distinctly claim as our invention:

1. A process of producing predominantly lower oxidation products from hydrocarbons which comprises passing longitudinally through an elongated passage under substantial super-atmospheric pressure concurrent streams of a gas containing free oxygen and a liquid hydrocarbon body rich in unsaturates, in the substantial absence of a catalyst, at an average rate of from about .0038 to .0825 mole of oxygen per minute per mole of hydrocarbon for a period of from about 10 minutes to 60 minutes, and simultaneously removing a major proportion of the heat generated as the oxygen combines with such hydrocarbon such that the temperature of said liquid body is maintained between 140° C. and 170° C.

2. A process of producing predominantly lower oxidation products from hydrocarbons which comprises subjecting a hydrocarbon rich in unsaturates in the liquid phase to the action of a gas containing free oxygen at an average rate of from about .0038 to .0825 mole of oxygen per minute per mole of hydrocarbon for a period of no more than 15 minutes, and simultaneously removing a major proportion of the heat generated as the oxygen combines with such hydrocarbon such that the temperature of the liquid is maintained between 140° C. and 170° C.

CARL F. PRUTTON.
CLARK O. MILLER.
WILLIS G. CRAIG.

(References on following page)

REFERENCES CITED

The following references are of record in the file of this patent:

UNITED STATES PATENTS

| Number | Name | Date |
|---|---|---|
| 1,690,768 | Burwell | Nov. 6, 1928 |
| 1,735,486 | Young | Nov. 12, 1929 |
| 1,770,875 | Burwell | July 15, 1930 |
| 1,858,822 | Frolich | May 17, 1932 |
| 1,865,081 | Chappell | June 28, 1932 |
| 1,892,038 | Cross | Dec. 17, 1932 |
| 1,904,452 | Haslam | Apr. 18, 1933 |
| 1,963,070 | Bludworth | June 19, 1934 |
| 1,978,621 | Burke | Oct. 30, 1934 |
| 1,990,229 | Friedelsheim et al | Feb. 5, 1935 |
| 2,024,680 | Curtis | Dec. 17, 1935 |
| 2,250,468 | Cockerille | July 29, 1941 |